United States Patent [19]

Son

[11] Patent Number: 5,796,754

[45] Date of Patent: Aug. 18, 1998

[54] APPARATUS FOR TESTING DIGITAL SIGNAL PROCESSOR IN OPTICAL DISK PLAYER

[75] Inventor: Woog-Ig Son, Suwon, Rep. of Korea

[73] Assignee: SamSung Electronics Co., Ltd., Suwon, Rep. of Korea

[21] Appl. No.: 717,151

[22] Filed: Sep. 20, 1996

[30] Foreign Application Priority Data

Apr. 4, 1996 [KR] Rep. of Korea ............... 10272/1996

[51] Int. Cl.$^6$ .................................................. G01R 31/28
[52] U.S. Cl. .................. 371/27.1; 371/22.5; 371/22.6; 369/54; 369/58
[58] Field of Search ................................ 371/27.1, 27.5, 371/22.6, 27.2; 369/32, 53, 54; 360/73.01, 73.03

[56] References Cited

U.S. PATENT DOCUMENTS

| | | | |
|---|---|---|---|
| 4,420,774 | 12/1983 | Sato | 360/28 |
| 4,949,323 | 8/1990 | Yoshida | 369/32 |
| 5,410,439 | 4/1995 | Egbert et al. | 360/75 |
| 5,612,845 | 3/1997 | Smith | 360/137 |

Primary Examiner—Hoa T. Nguyen
Attorney, Agent, or Firm—Robert E. Bushnell

[57] ABSTRACT

An apparatus for testing the operation of a digital signal processor in an optical disk player includes a microcomputer for generating a control signal representative of a data transmission speed of the optical disk player. The microcomputer also evaluates the operation of the digital signal processor based on a digital signal received from the digital signal processor. A pattern generating unit receives the control signal, generates a radio frequency signal corresponding to the data transmission speed in response to the control signal, and provides the radio frequency signal to the digital signal processor. The digital signal processor generates the digital signal in response to the radio frequency signal. A display provides display of the result of the evaluation performed by the microcomputer.

14 Claims, 2 Drawing Sheets

APPARATUS FOR TESTING DIGITAL SIGNAL PROCESSOR IN OPTICAL DISK PLAYER

CROSS-REFERENCE TO RELATED APPLICATIONS

This application makes reference to, incorporates the same herein, and claims all benefits accruing under 35 U.S.C. §119 arising from an application for Apparatus For Testing Digital Signal Processor In Optical Disk Player earlier filed in the Korean Industrial Property Office on 4 Apr., 1996 and there duly assigned Serial No. 10272/1996.

BACKGROUND OF THE INVENTION

The present invention generally relates to an optical disk player, and more particularly, to an apparatus for testing the operation of a digital signal processor (DSP) employed in an optical disk player.

In the operation of a general optical disk player, information recorded on a disk is read by an optical pickup unit and converted into a radio frequency (RF) signal. Thereafter, a digital signal processor (DSP) converts the radio frequency (RF) signal into a digital signal. With the optical disk player, as with other digital equipment, proper operation can only be achieved when the digital processing components operate effectively. Accordingly, it is necessary to test the operation of the digital processing components. One exemplar of the art, U.S. Pat. No. 5,469,075 issued to Oke et al., broadly addresses this issue by disclosing a method and system for testing a microprocessor. In Oke et al. '075, testing is achieved by using multiplexers to connect device input and output pads directly to inputs and outputs of the microprocessor. While the testing of digital processing circuitry, generally speaking, is known, as evidenced by Oke et al. '075, I have found that the contemporary efforts in art fail to disclose a technique for testing a digital signal processor (DSP) employed within an optical disk player. Accordingly, the present invention is provided to solve this deficiency in the prior art.

SUMMARY OF THE INVENTION

Accordingly, it is an object of the present invention to provide an improved optical disk player.

It is another object to provide an apparatus for testing the operation of a digital signal processor (DSP) in an optical disk player.

It is yet another object to provide an apparatus and process that can evaluate the operation of a digital signal processor (DSP) in an optical disk player, irrespective of the data transmission speed employed by the optical disk player.

It is still another object to provide an apparatus and process for testing the operation of a digital signal processor (DSP) in an optical disk player.

It is yet another object to provide an apparatus and process for minimizing errors during testing of a signal processor for a data storage memory.

To achieve these and other objects, the present invention provides an apparatus for testing the operation of a digital signal processor in an optical disk player. The apparatus includes a microcomputer for generating a control signal representative of a data transmission speed of the optical disk player. The microcomputer also evaluates the operation of the digital signal processor based on a digital signal received from the digital signal processor. A pattern generating unit receives the control signal, generates a radio frequency signal corresponding to the data transmission speed in response to the control signal, and provides the radio frequency signal to the digital signal processor. The digital signal processor generates the digital signal in response to the radio frequency signal. A display provides display of the result of the evaluation performed by the microcomputer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
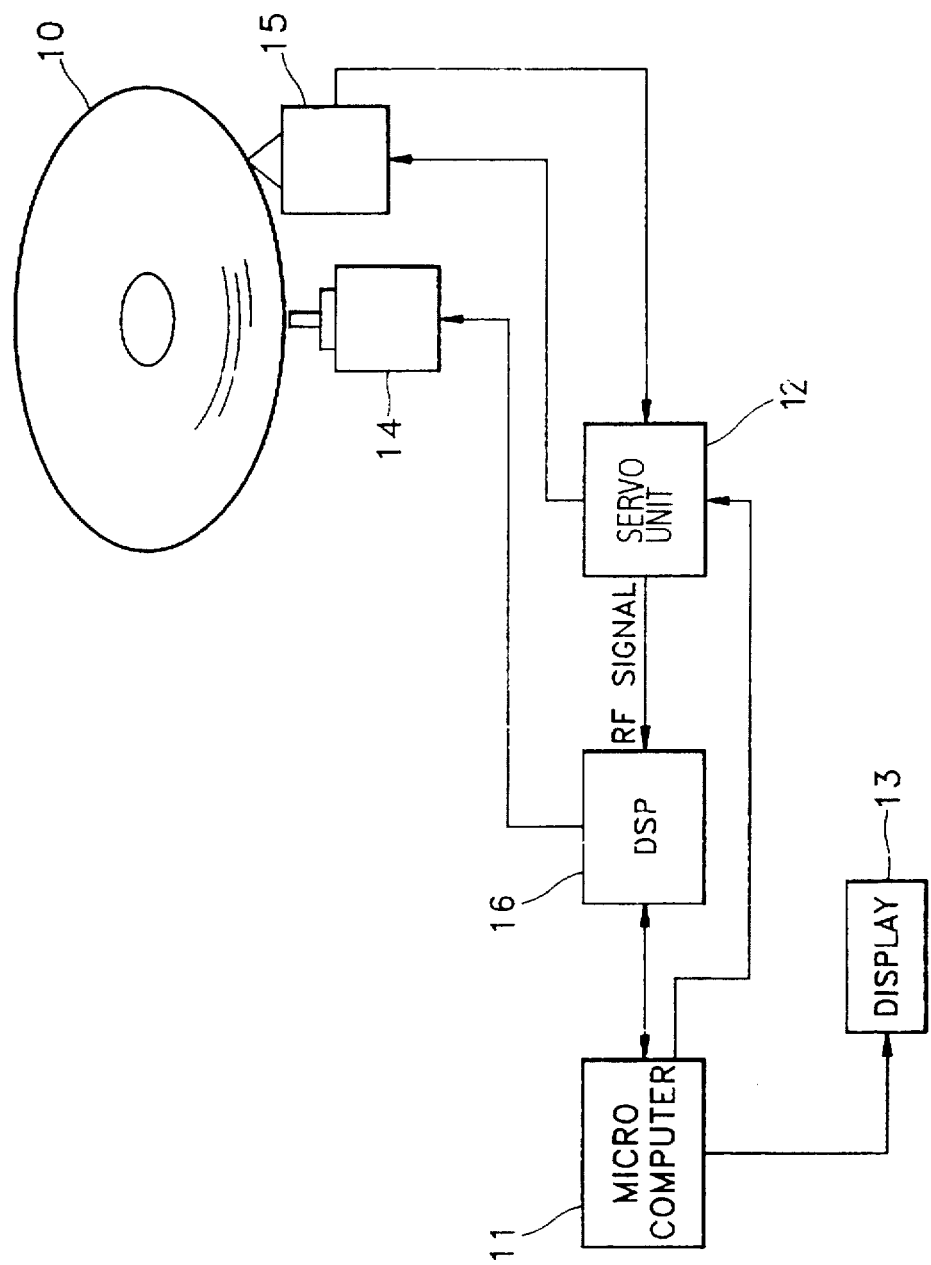
FIG. 1 is a block diagram showing an abstract representation of an apparatus for testing a digital signal processor (DSP) in an optical disk player.

Turning now to the drawings and referring to FIG. 1, an abstract representation of an apparatus for testing a digital signal processor (DSP) in an optical disk player is shown. The apparatus of FIG. 1 includes: a disk 10, a microcomputer 11, a servo unit 12, a display 13, a spindle motor 14, an optical pickup 15, and a digital signal processor (DSP) 16 which is tested by the testing apparatus electrically connected therewith. Since the apparatus for testing the digital signal processor (DSP) 16 of FIG. 1 is constituted by a module of the optical disk player, the spindle motor 14 and optical pickup 15 are required. In particular, a radio frequency (RF) signal required for testing digital signal processor (DSP) 16 is generated by projecting a laser beam from the optical pickup 15 onto disk 10 and receiving the reflected beam.

Since data transmission speeds of various optical disk players differ according to their type, the module for testing the digital signal processor (DSP) 16 must be recomposed according to the data transmission speed. For example, in order to test the operation of the digital signal processor (DSP) 16 when employed in an 8X compact disk-read only memory (CD-ROM) where 1X=150 KB/sec, the module must be capable of applying an octuple speed radio frequency (RF) signal to the digital signal processor (DSP) 16. Therefore, the disk 10, spindle motor 14 and optical pickup unit 15, which are adapted to such a case, are required. In these cases, recomposition of the module is inconvenient, and when the module is composed of multiple components, testing errors increase.

Figure 2:
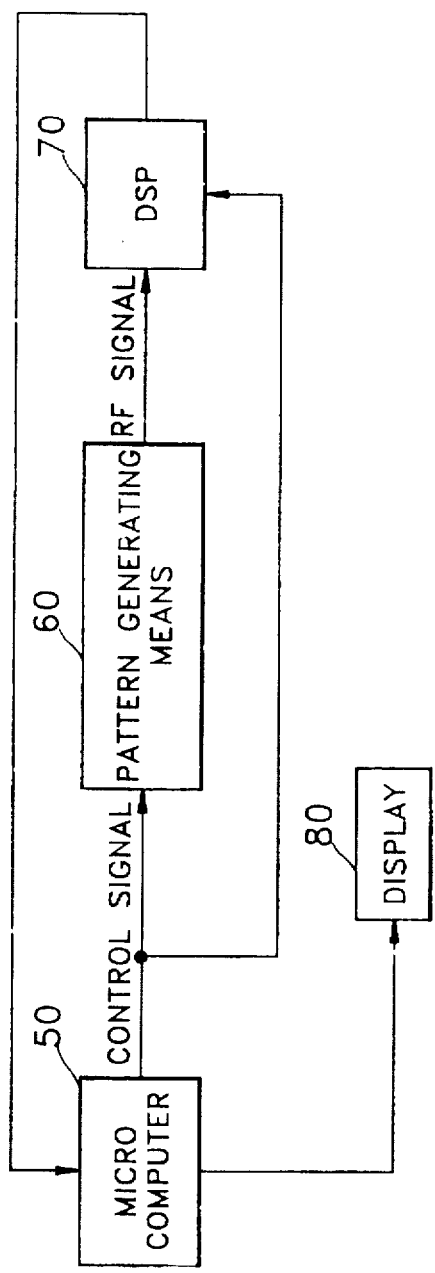
FIG. 2 is a block diagram showing an apparatus for testing a digital signal processor (DSP) in an optical disk player according to the principles of the present invention.

Referring now to FIG. 2, a block diagram of an apparatus for testing a digital signal processor (DSP) in an optical disk player according to the principles of the present invention is shown. The apparatus of FIG. 2 includes: a microcomputer 50 for generating a control signal according to the data transmission speed of an optical disk player (not shown), a pattern generating unit 60 for applying a radio frequency (RF) signal to a digital signal processor (DSP) 70 in response to receipt of the control signal, and a display 80. In FIG. 2, the radio frequency (RF) signal transmitted from the pattern generating unit 60 is the same as an electrical signal generated by reading information recorded on disk 10 via the optical pickup 15 in FIG. 1. During testing, digital signal processor (DSP) 70 converts the radio frequency (RF) signal provided from pattern generating unit 60 into a digital signal, and outputs the digital signal to microcomputer 50. Microcomputer 50 reads the digital signal transmitted from digital signal processor (DSP) 70, evaluates the signal processing operation performed by digital signal processor (DSP) 70 based on the digital signal, and outputs the results to display 80 so they can be visually observed.

Figure 3:
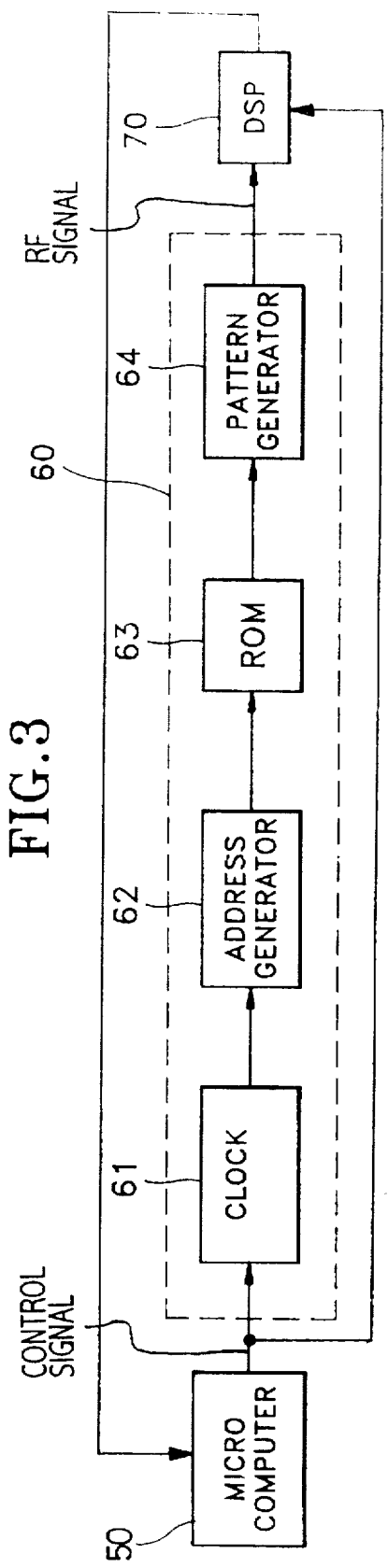
FIG. 3 is a block diagram showing details of the pattern generating unit of FIG. 2.

A preferred embodiment of pattern generating unit 60 will now be described in detail with reference to FIG. 3. Pattern generating unit 60 of FIG. 3 may be constructed with a clock 61, an address generator 62, a read only memory (ROM) 63, and a pattern generator 64. Clock 61 receives the control signal from microcomputer 50 according to the data transmission speed, and applies a clock signal to address generator 62. The control signal output from microcomputer 50 represents the data transmission speed and controls the clock frequency of clock 61. Address generator 62 transmits an address signal corresponding to the clock signal to read only memory (ROM) 63. Read only memory (ROM) 63, which stores various testing data, outputs the data specified by the address signal. Pattern generator 64 receives the data output from read only memory (ROM) 63, and applies the radio frequency (RF) signal according to the data transmission speed to digital signal processor (DSP) 70.

Therefore, it is possible to successively examine the operation of digital signal processor (DSP) 70 according to the applicable data transmission speed since microcomputer 50 transmits corresponding information to pattern generating unit 60 when the data transmission speed is changed, and pattern generating unit 60 generates the required radio frequency (RF) signal according to the information for application to digital signal processor (DSP) 70.

As described above, the apparatus for testing the operation of digital signal processor (DSP) 70 of an optical disk player according to the present invention reduces the time required for testing since successive tests can be performed by using pattern generating unit 60 to generate the required radio frequency (RF) signal. Accordingly, reconstruction of the module according to the data transmission speed is not required. Moreover, the occurrence of testing errors caused by using multiple components can be reduced since only one pattern generating unit is employed, and components of the optical disk player, such as the spindle motor, disk and optical pickup, are not utilized.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An apparatus for testing the operation of a digital signal processor in an optical disk player, said apparatus comprising:

a microcomputer generating a control signal representative of a data transmission speed of said optical disk player, and making an evaluation of the operation of the digital signal processor based on a digital signal received from said digital signal processor;

a pattern generator responding to reception of said control signal by, generating a radio frequency signal corresponding to said data transmission speed in response to said control signal and applying said radio frequency signal to the digital signal processor, to enable the digital signal processor be generate said digital signal in response to said radio frequency signal; and a visual display displaying an indication of said evaluation performed by said microcomputer.

2. The apparatus as claimed in claim 1, wherein said pattern generator comprises:

a clock responding to said control signal by generating a clock signal;

an address generator responding to said clock signal by generating an address;

a memory storing specified data within said memory at locations addressable on a basis of said address signal; and a pattern generator applying of said radio frequency signal to the digital signal processor in response to said specified data.

3. The apparatus as claimed in claim 2, wherein a frequency exhibited by said clock signal is controlled in dependence upon said control signal.

4. The apparatus as claimed in claim 3, wherein said memory comprises a read only memory.

5. The apparatus as claimed in claim 2, wherein said memory comprises a read only memory.

6. A method for testing the operation of a digital signal processor in an optical disk player, said method comprising the steps of:

generating a control signal representative of a data transmission speed of said optical disk player;

generating a radio frequency signal corresponding to said data transmission speed in response to said control signal, and providing said radio frequency signal to said digital signal processor;

generating a digital signal, via said digital signal processor, in response to said radio frequency signal;

making an evaluation of the operation of said digital signal processor based on said digital signal generated via said digital signal processor; and providing visual display of a message indicative of said evaluation.

7. An apparatus for testing the operation of a digital signal processor in an optical disk player, said apparatus comprising:

a microcomputer generating a control signal representative of a data transmission speed of said optical disk player;

a clock connected to said microcomputer, generating a clock signal in response to said control signal;

an address generator, connected to said clock, generating an address signal in response to said clock signal;

a memory, connected to said address generator, storing information at addresses within said memory corresponding to said address signal;

a pattern generator, connected to said memory, providing a radio frequency signal corresponding to said data transmission speed;

said pattern generator solicitating generation of a digital signal by applying said radio frequency signal to a digital signal processor operationly governed by said control signal: and said microcomputer making an evaluation of the operation of the digital signal processor based on said digital signal provided from said digital signal processor.

8. The apparatus as claimed in claim 7, wherein a frequency exhibited by said clock signal is controlled in dependence upon said control signal.

9. The apparatus as claimed in claim 8, wherein said memory comprises a read only memory.

10. The apparatus of claim 7, with said clock generating said clock signal with a frequency varying in dependence upon said control signal.

11. The apparatus as claimed in claim 7, wherein said memory comprises a read only memory.

12. The apparatus of claim 7, with said pattern generator applying said radio frequency signal to the digital signal processor in dependence upon said information.

13. The apparatus of claim 7, further comprising:

said clock generating said clock signal with a frequency varying in dependence upon said control signal: and said pattern generator applying said radio frequency signal to the digital signal processor in dependence upon said information.

14. The apparatus of claim 7, comprised of said microcomputer driving a monitor to provide visual representation of said evaluation.

* * * * *